(12) United States Patent
Karabinis

(10) Patent No.: US 7,092,708 B2
(45) Date of Patent: Aug. 15, 2006

(54) SYSTEMS AND METHODS FOR INCREASING CAPACITY AND/OR QUALITY OF SERVICE OF TERRESTRIAL CELLULAR AND SATELLITE SYSTEMS USING TERRESTRIAL RECEPTION OF SATELLITE BAND FREQUENCIES

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 502 days.

(21) Appl. No.: 10/317,320

(22) Filed: Dec. 12, 2002

(65) Prior Publication Data

US 2004/0203742 A1    Oct. 14, 2004

(51) Int. Cl.
*H04Q 7/20* (2006.01)

(52) U.S. Cl. .................. 455/428; 455/552.1; 455/427; 455/13.2; 455/426.1

(58) Field of Classification Search ................ 455/427, 455/428, 429, 430, 3.02, 13.2, 98, 12.1, 552.1, 455/426.1, 436, 448
See application file for complete search history.

(56) References Cited

U.S. PATENT DOCUMENTS

| | | | |
|---|---|---|---|
| 5,073,900 A | 12/1991 | Mallinckrodt | |
| 5,339,330 A | 8/1994 | Mallinckrodt | |
| 5,394,561 A * | 2/1995 | Freeburg | .................... 455/428 |
| 5,446,756 A | 8/1995 | Mallinckrodt | |
| 5,511,233 A | 4/1996 | Otten | |
| 5,612,703 A | 3/1997 | Mallinckrodt | |
| 5,832,379 A | 11/1998 | Mallinckrodt | |
| 5,835,857 A | 11/1998 | Otten | |
| 5,848,359 A | 12/1998 | Furtaw | |
| 5,878,329 A | 3/1999 | Mallinckrodt | |
| 5,940,753 A | 8/1999 | Mallinckrodt | |
| 5,995,832 A | 11/1999 | Mallinckrodt | |
| 6,052,560 A | 4/2000 | Karabinis | |
| 6,108,539 A * | 8/2000 | Ray et al. | .................... 455/427 |
| 6,108,561 A | 8/2000 | Mallinckrodt | |
| 6,301,313 B1 * | 10/2001 | Gevargiz et al. | ........... 455/13.1 |
| 6,449,461 B1 | 9/2002 | Otten | |
| 6,522,865 B1 | 2/2003 | Otten | |
| 6,714,760 B1 * | 3/2004 | Robinett | .................... 455/3.02 |

(Continued)

FOREIGN PATENT DOCUMENTS

EP    0 597 225 A1    5/1994

(Continued)

OTHER PUBLICATIONS

International Search Report, PCT/US03/25771, Nov. 28, 2003.

(Continued)

*Primary Examiner*—Joseph Feild
*Assistant Examiner*—Huy D. Nguyen
(74) *Attorney, Agent, or Firm*—Myers Bigel Sibley & Sajovec

(57) ABSTRACT

The capacity of a terrestrial wireless communications system that uses a terrestrial frequency band for communications with wireless terminals is expanded by utilizing a satellite frequency band for terrestrially receiving terrestrial communications from the wireless terminals. Since the wireless terminals are configured to transmit communications to a space-based component such as a satellite via a satellite frequency band, these transmissions also may be picked up (received) terrestrially. Thus, terrestrial base stations can be equipped with satellite frequency band receivers that can receive communications from the wireless terminals over a satellite frequency band. By using the satellite frequency band receiver in a terrestrial base station, additional capacity and/or quality of service may be provided for a terrestrial and/or satellite communications system.

15 Claims, 3 Drawing Sheets

U.S. PATENT DOCUMENTS

2002/0177465 A1*  11/2002  Robinett ..................... 455/552
2003/0022625 A1   1/2003  Otten et al.
2003/0149986 A1   8/2003  Mayfield et al.

FOREIGN PATENT DOCUMENTS

| | | |
|---|---|---|
| EP | 0 858 177 A2 | 8/1998 |
| WO | WO 02/11302 A2 | 2/2002 |
| WO | WO 02/11302 A3 | 2/2002 |

OTHER PUBLICATIONS

Ayyagari et al., *A satellite-augmented cellular network concept*, Wireless Networks, vol. 4, No. 2, Feb. 1, 1998, pp. 189-198.

Rickerson et al., *Symphony or Calliope-Frequency Management With Mobile Satellite Services*, IEEE Annual Military Communications Conference, vol. 15, Oct. 22, 1996, pp. 943-947.

* cited by examiner

SYSTEMS AND METHODS FOR INCREASING CAPACITY AND/OR QUALITY OF SERVICE OF TERRESTRIAL CELLULAR AND SATELLITE SYSTEMS USING TERRESTRIAL RECEPTION OF SATELLITE BAND FREQUENCIES

FIELD OF THE INVENTION

This invention relates to wireless communications systems and methods, and more particularly to terrestrial wireless communications systems and methods.

BACKGROUND OF THE INVENTION

Terrestrial wireless communications systems and methods such as terrestrial cellular communications systems and methods are widely used to provide voice and/or data communications to subscribers within a prescribed geographic area. For example, analog terrestrial cellular communications systems and methods, such as those designated AMPS, ETACS, NMT-450 and NMT-900 have been deployed successfully throughout the world. Digital cellular radiotelephone systems and methods, such as those designated IS-1 36 in North America and GSM in Europe also are being widely used. Moreover, Personal Communication Services (PCS) cellular systems and methods, such as those designated IS-95, PCS-1900 and PACS in North America, DCS-1800 and DECT in Europe, and PHS in Japan, also have been deployed for voice and/or high bit-rate data communications.

As is well known to those having skill in the art, terrestrial cellular communications systems and methods may employ a plurality of terrestrial components, also referred to as base stations, which transmit communications to a plurality of wireless terminals over a terrestrial cellular frequency band and receive communications from the wireless terminals over the terrestrial cellular frequency band. The wireless links that are used to transmit communications from the base stations to the wireless terminals are also referred to as forward links, and the wireless links that are used to receive communications from the wireless terminals at the base stations are also referred to as return links.

The following Table illustrates frequency bands that have been designated for terrestrial cellular and satellite cellular use in the United States. These frequency bands are only representative, and other frequency bands may be used within or outside the United States.

TABLE

|  | Forward Link | Return Link |
| --- | --- | --- |
| Terrestrial Cellular | 869.01–893.97 MHz | 824.01–848.97 MHz |
| Terrestrial Cellular PCS | 1930–1990 MHz | 1850–1910 MHz |
| Satellite Cellular L-Band | 1525–1559 MHz | 1626.5–1660.5 MHz |
| Satellite Cellular Big LEO-Band | 2484.39–2499.15 MHz | 1610.73–1625.49 MHz |
| Satellite Cellular S-Band | 2165–2200 MHz | 1990–2025 MHz |

The overall design and operation of terrestrial cellular communications systems and methods are well known to those having skill in the art, and need not be described further herein. Moreover, as used herein, the term "wireless terminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver.

As the number of users and/or applications in a terrestrial wireless communications system or method continue to increase, it may be desirable to increase the capacity and/or quality of service of the forward and/or return links that are used for communications between the base stations and the wireless terminals. One way to increase this capacity and/or quality of service is to increase the frequency spectrum that is available for use by the terrestrial wireless communications systems and methods. However, as is well known, the radio frequency spectrum generally is tightly controlled by governmental agencies, such as the Federal Communications Commission (FCC) in the United States. The FCC regulates the frequency bands that electronic equipment may use to transmit information, and also regulates the maximum in-band and/or out-of-band power levels that may be radiated by the specific equipment type.

SUMMARY OF THE INVENTION

Some embodiments of the present invention expand the capacity and/or quality of service of a terrestrial wireless communications system or method that uses a terrestrial frequency band for communications with wireless terminals, by utilizing a satellite frequency band for terrestrially receiving terrestrial communications from the wireless terminals. In some embodiments, the satellite frequency band is not used for terrestrially transmitting communications to the wireless terminals. Embodiments of the invention may stem from a realization that if a wireless terminal is configured to transmit communications to a space-based component such as a satellite via a satellite frequency band, these transmissions also may be picked up (received) terrestrially without the need for additional regulatory approval. Thus, terrestrial base stations can be equipped with satellite frequency band receivers that can receive communications from the wireless terminals over the satellite frequency band. By using the satellite frequency band receiver in a terrestrial base station, additional capacity and/or quality of service may be provided for terrestrial and/or satellite wireless communications systems or methods.

Terrestrial base stations for terrestrial wireless communications systems according to some embodiments of the present invention include a transmitter that is configured to transmit communications to wireless terminals over a terrestrial frequency band and a receiver that is configured to receive communications from the wireless terminals over a satellite frequency band. In some embodiments, the transmitter is configured to transmit communications to the wireless terminals over forward link and return link portions of the terrestrial frequency band. In other embodiments, the transmitter is configured to transmit communications to the wireless terminals over the forward link and return link portions of the terrestrial frequency band without receiving communications from the wireless terminals over a terrestrial frequency band. Other embodiments may configure the receiver to also receive communications from the wireless terminals over a terrestrial frequency band.

Terrestrial base stations for terrestrial wireless communications systems according to other embodiments of the invention include a receiver that is configured to receive communications from wireless terminals over a satellite frequency band, wherein the base station is free of a transmitter that is configured to transmit communications to the wireless terminals over a satellite frequency band. Other embodiments may configure the receiver to also receive communications from the wireless terminals over a terrestrial frequency band.

Wireless terminals according to some embodiments of the invention comprise a receiver that is configured to receive communications over forward link and return link portions of a terrestrial frequency band and a transmitter that is configured to transmit communications over a satellite frequency band. In other embodiments, the receiver is further configured to receive communications over a satellite frequency band, and the transmitter is further configured to transmit communications over a terrestrial frequency band.

Finally, wireless communications systems according to some embodiments of the present invention include a space-based component such as a satellite that is configured to transmit communications to wireless terminals over a satellite frequency band, and to receive communications from the wireless terminals over the satellite frequency band. A terrestrial component such as a base station is configured to transmit communications to the wireless terminals over a terrestrial frequency band, and to receive communications from the wireless terminals over the satellite frequency band. In other embodiments, the terrestrial component is further configured to receive communications from the wireless terminals over a terrestrial frequency band. In still other embodiments, the terrestrial component is further configured to transmit communications to the wireless terminals over forward link and return link portions of the terrestrial frequency band.

In some embodiments, the terrestrial frequency band is a terrestrial cellular frequency band and the satellite frequency band is a satellite cellular frequency band. In other embodiments, the terrestrial frequency band is a terrestrial cellular frequency band and the satellite frequency band is a satellite non-cellular frequency band. In yet other embodiments, the terrestrial frequency band is a terrestrial non-cellular frequency band, and the satellite frequency is a satellite cellular frequency band. Finally, in still other embodiments, both the satellite frequency band and the terrestrial frequency band are non-cellular. Accordingly, some embodiments of the present invention allow the capacity and/or quality of service of terrestrial wireless and/or satellite networks to be increased by terrestrially receiving communications from wireless terminals over a satellite frequency band.

DETAILED DESCRIPTION OF PREFERRED EMBODIMENTS

The present invention now will be described more fully hereinafter with reference to the accompanying drawings, in which embodiments of the invention are shown. This invention should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
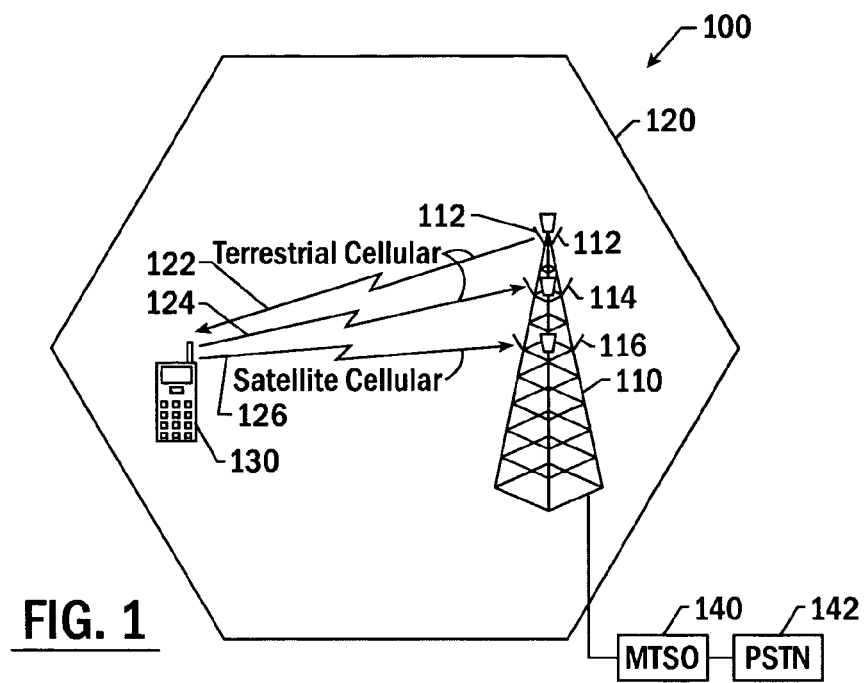
FIGS. 1–6 are block diagrams of wireless communications systems, methods, radiotelephones and base stations according to some embodiments of the present invention.

FIG. 1 illustrates wireless communications systems and methods, such as cellular communications systems and methods, according to some embodiments of the present invention. It will be understood that in other embodiments, non-cellular terrestrial wireless and/or non-cellular satellite communications systems and methods may be used.

As shown in FIG. 1, a terrestrial cellular communications system and method 100 may implement any one or more of the aforementioned wireless communications standards. The systems/methods may communicate with one or more wireless terminals 130 via a plurality of cells 120 served by base stations 110, also referred to as terrestrial components, and a Mobile Telephone Switching Office (MTSO) 140. Although only one cell 120 is shown in FIG. 1, a typical cellular system/method 100 may comprise hundreds of cells, may include more than one MTSO 140, and may serve thousands of wireless terminals 130.

The cells 120 generally serve as nodes in the wireless communications systems/methods 100, from which links are established between wireless terminals 130 and the MTSO 140. The communications systems/methods 100 allow a duplex radio communication link to be established between two wireless terminals 130 or between a wireless terminal 130 and a land line telephone and/or computer user via the Public Switched Telephone Network (PSTN) 142 and/or other wireless and/or wireline networks.

As also shown in FIG. 1, cellular communications systems and methods 100 according to some embodiments of the invention include a terrestrial component 110 that includes a terrestrial cellular transmitter 112 that is configured to transmit wireless communications to the wireless terminals 130 over a terrestrial cellular frequency band, which may be a conventional terrestrial cellular forward link 122. A terrestrial cellular receiver 114 is configured to receive communications from the wireless terminals 130 over a terrestrial cellular frequency band, such as a conventional terrestrial cellular return link 124. As also shown, the terrestrial component 110 also includes a satellite receiver 116 that is configured to receive communications from wireless terminals 130 over a satellite frequency band, such as a satellite cellular return link 126. It will be understood by those having skill in the art that, although a separate terrestrial cellular transmitter 112, terrestrial cellular receiver 114 and satellite receiver 116 are shown in FIG. 1, two or more of these functions may be combined, in whole or in part, into one or more elements.

Accordingly, FIG. 1 illustrates improving the quality of service of the satellite return link by receiving the satellite band transmission of terminal 130 terrestrially by satellite band receiver 116 of the terrestrial component 110. FIG. 1 also illustrates expanding capacity of the terrestrial cellular communications system and/or method 100 that uses terrestrial cellular frequency bands for communications with wireless terminals 130, by utilizing a satellite frequency band for terrestrially receiving terrestrial communications from the wireless terminals 130.

Embodiments shown in FIG. 1 can utilize a conventional terrestrial cellular forward link 122 and a conventional terrestrial cellular return link 124 in a conventional manner, to communicate terrestrially with radiotelephones 130. Additional return link capacity and/or quality of service is provided by utilizing a satellite return link 126 for additional communications.

Figure 2:
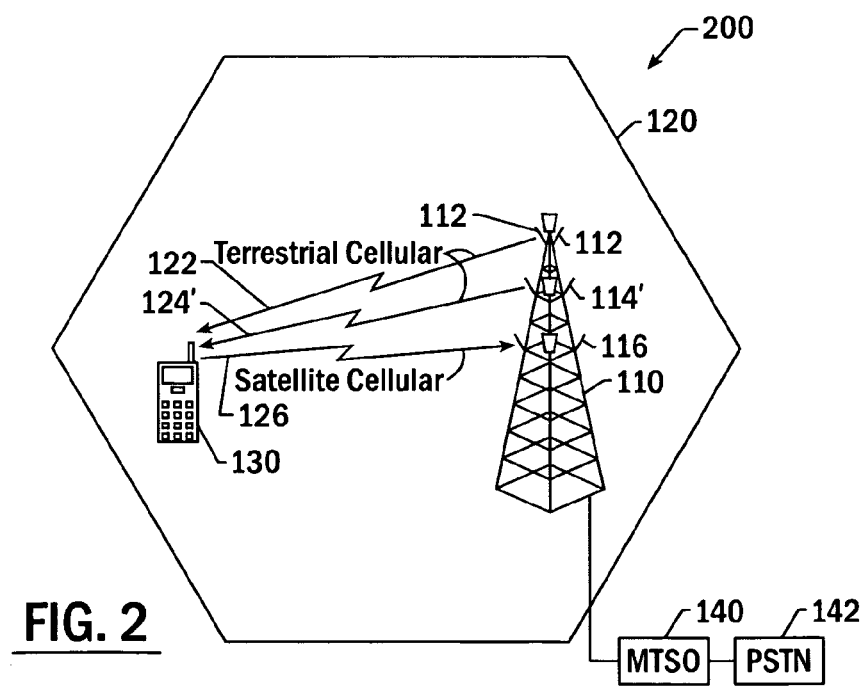

FIG. 2 illustrates other wireless communications systems and methods, such as cellular communications systems and methods, according to other embodiments of the present invention. In these embodiments of cellular communications systems and methods 200, at least some of the satellite return link frequency band is used by the terrestrial component 110 to receive communications from the wireless terminals 130, thereby freeing at least some of the bandwidth of the terrestrial cellular return link 124 to be used as part of a terrestrial cellular forward link for transmitting by the terrestrial component 110 to the wireless terminals 130. Thus, the direction of the arrow on the terrestrial cellular return link 124' has been reversed compared to link 124 of FIG. 1, indicating that it is being used as part of the terrestrial cellular forward link. Moreover, a terrestrial cellular transmitter 114' is used, rather than a terrestrial cellular receiver 114 of FIG. 1. The capacity of the terrestrial cellular forward link thereby may be approximately doubled over conventional terrestrial cellular systems and/or the quality of service may be increased. It will be understood that in other embodiments, non-cellular terrestrial wireless and/or non-cellular satellite communications systems and methods may be used.

This added forward link capacity of embodiments of FIG. 2 may be particularly desirable for data communications. In particular, for voice communications, approximately equal forward and return link capacities may generally be desired, to mirror the statistically symmetric nature of full duplex voice communications. However, for data communications, relatively few bits of information, such as a single mouse click or other indication from a user, that are transmitted from a wireless terminal 130, may generate a large volume of data, including graphical and/or multimedia data to be downloaded to the wireless terminal 130. Accordingly, the approximately doubled capacity and/or quality of service of the terrestrial forward link may be particularly desirable for data communications. It also will be understood that, in other embodiments, only a portion of the conventional terrestrial cellular return link 124 may be used to form forward link 124' for communicating from the terrestrial base station 110 to the wireless terminals 130, while the remainder of the terrestrial cellular return link 124 may be used conventionally to communicate from the wireless terminals 130 to the terrestrial base station 110.

Figure 3:
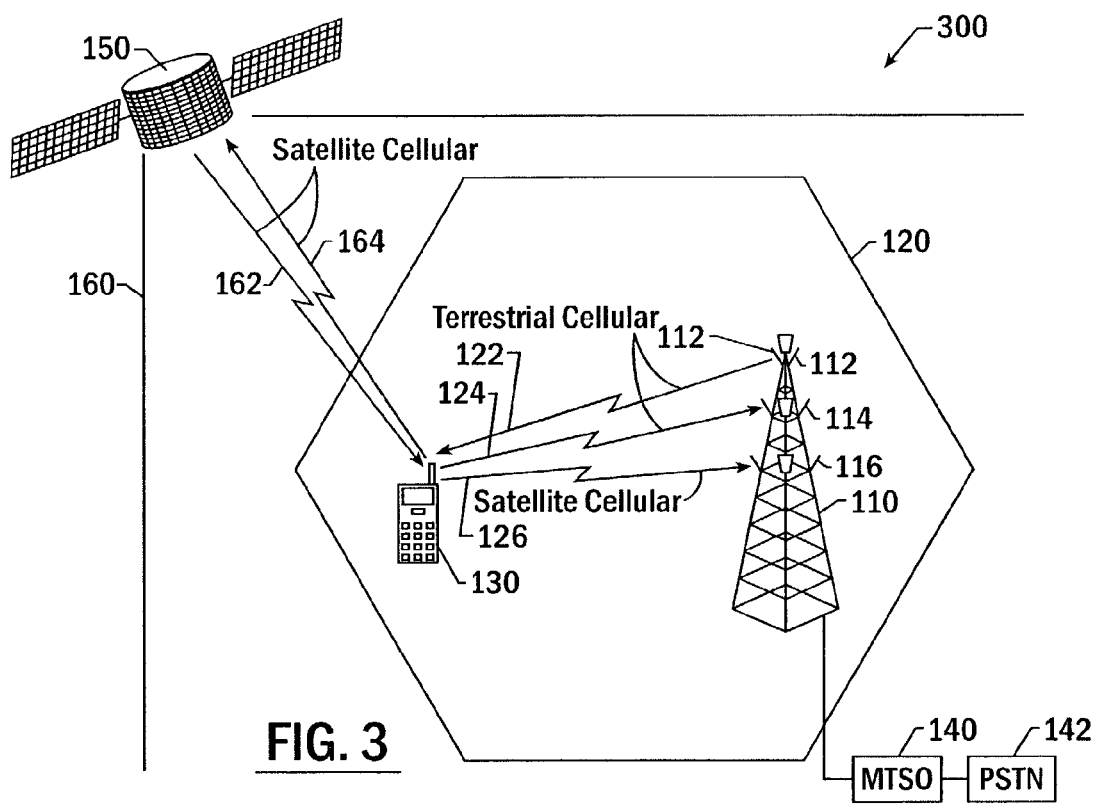

FIG. 3 illustrates wireless radiotelephone systems and methods 300, such as cellular radiotelephone systems and methods, according to still other embodiments of the invention. In these embodiments, a space-based component 150, such as a satellite, also is added. The space-based component 150 is configured to transmit wireless communications to a plurality of wireless terminals 130 in a satellite footprint 160, which generally may geographically overlap many terrestrial cells 120. As shown in FIG. 3, the space-based component is configured to transmit communications to the wireless terminals 130 over a satellite frequency band, such as a satellite cellular forward link frequency band 162, and to receive communications from the wireless terminals 130 over a satellite frequency band, such as a satellite cellular return link frequency band 164. It will be understood by those having skill in the art that the communications shown over the satellite cellular return band 164 and the satellite cellular return band 126 may be substantially identical or overlapping, such that transmissions by the wireless terminals 130 over the satellite frequency band may be intercepted by the satellite band receiver 116 of the base station 110, and thereby used terrestrially. It also will be understood that in other embodiments, non-cellular terrestrial wireless and/or non-cellular satellite communications systems and methods may be used.

Figure 4:
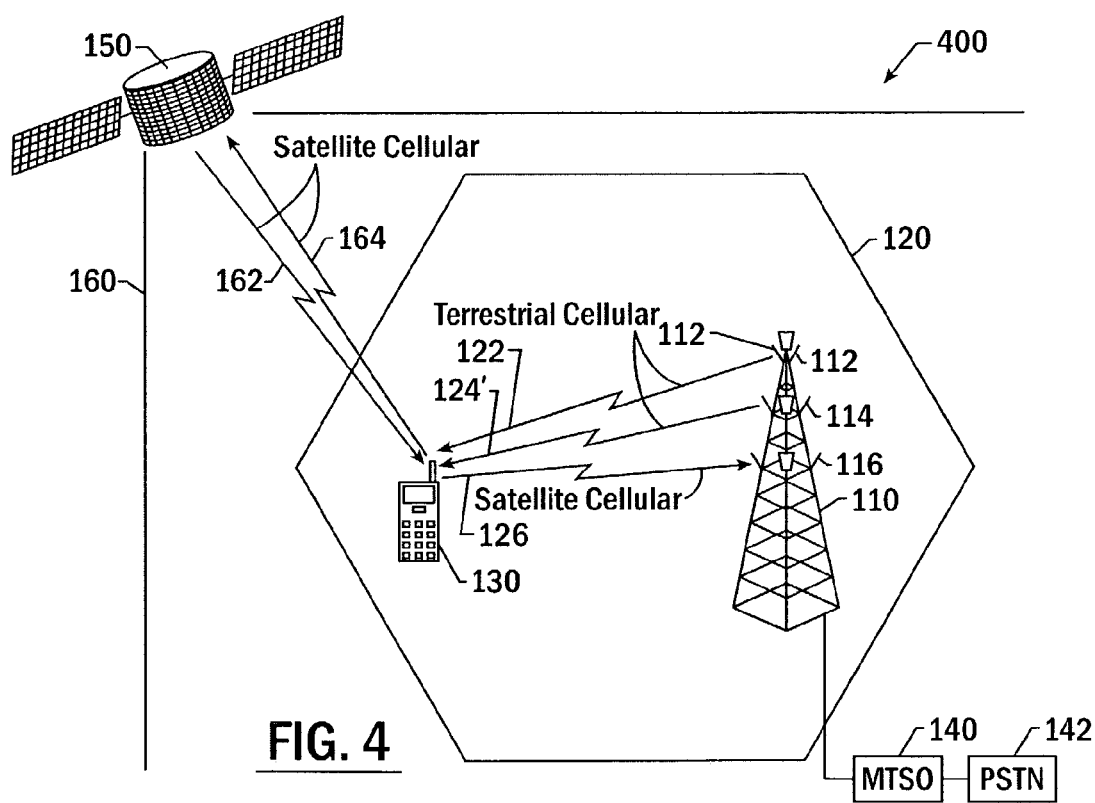

FIG. 4 illustrates other systems and methods 400 according to embodiments of the invention. More specifically, FIG. 4 illustrates adding a space-based component 150 to embodiments of FIG. 2.

Radiotelephone systems and methods, such as cellular radiotelephone systems and methods, according to embodiments of the present invention, may operate in multiple modes. In one mode, illustrated in FIG. 5, the systems and/or methods may operate as a conventional terrestrial cellular system or method 500, in which a conventional terrestrial cellular forward link 122 is used to transmit wireless communications from the base stations 110 to the wireless terminals 130, and a conventional terrestrial cellular return link 124 is used to receive wireless communications from the wireless terminals 130 at the base stations 110. In another mode, with the addition and/or utilization of a satellite band receiver 116, these systems or methods can operate using the configurations shown in FIGS. 1 and/or 2. More specifically, with the addition and/or utilization of a satellite band receiver 116, communications from the wireless terminals over a cellular satellite frequency band 126 may be received terrestrially at the base station 110. Conventional terrestrial cellular forward and reverse links may be used, as shown in FIG. 1, or all of the terrestrial cellular links may be used for transmitting communications from the base station 110 to the wireless terminals 130 as shown in FIG. 2. Other apportionments of the terrestrial cellular links also may be used. Moreover, in other embodiments, the wireless terminals 130 may include a satellite mode as indicated in FIGS. 3 and/or 4. It will be understood that in other embodiments, non-cellular terrestrial wireless and/or non-cellular satellite communications systems and methods may be used.

Figure 5:
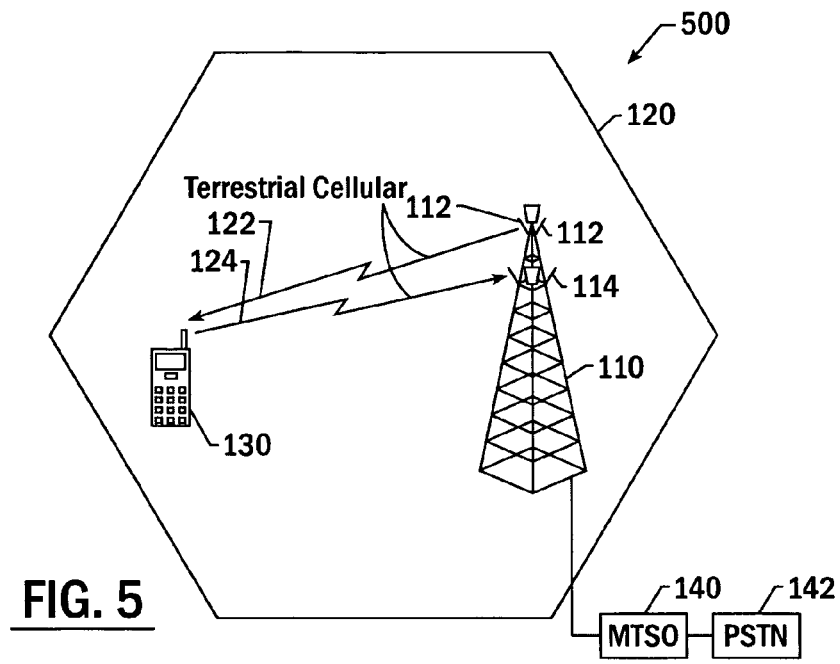

The wireless terminals 130 themselves also may be configured to operate in multiple modes. In one mode, as shown in FIG. 5, the wireless terminals may operate as conventional terrestrial cellular wireless terminals. In another mode, they may operate as conventional satellite cellular wireless terminals, as shown in FIGS. 3 and 4. In yet another mode, transmissions by the wireless terminals 130 to the MTSO 140 may be via the cellular satellite frequency band, as shown in FIGS. 1–4. Moreover, in some embodiments, the wireless terminals 130 include a receiver that is configured to receive communications over forward link and return link portions of a terrestrial cellular frequency band and a transmitter that is configured to transmit communications near a satellite cellular frequency band, as shown in FIGS. 2 and 4. Combinations of these modes also may be employed.

Figure 6:
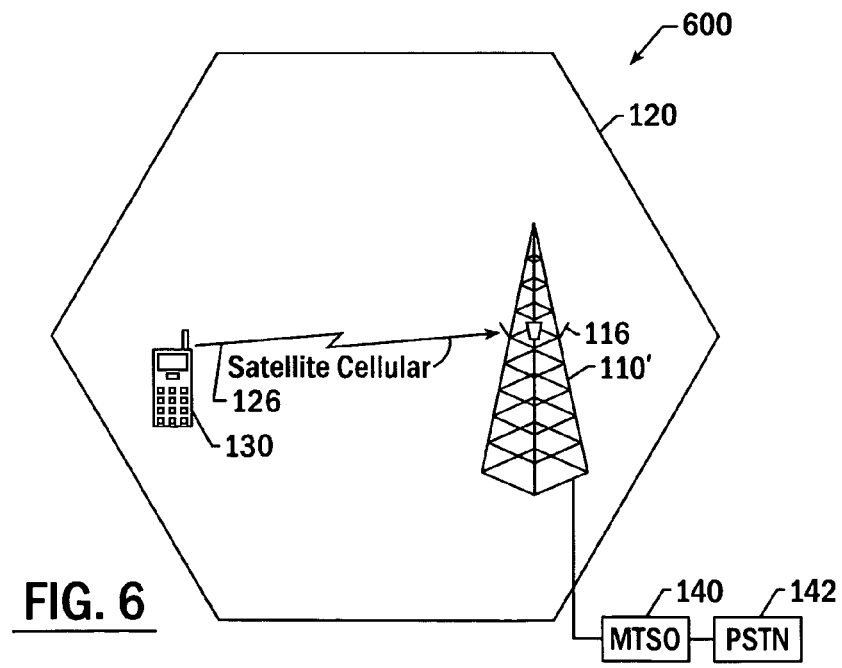

FIG. 6 illustrates other radiotelephone systems and methods 600, such as cellular radiotelephone systems and methods, according to yet other embodiments of the present invention. FIG. 6 may be contrasted with FIGS. 1–4, wherein a satellite band receiver 116 is added to a cellular base station 110 that includes a terrestrial cellular transmitter. In other embodiments of the invention, it may be desirable to place a satellite band receiver at a geographic location that is different from the locations of terrestrial cellular base stations. Accordingly, a satellite band only receiver base station 110' may be provided in these embodiments of cellular radiotelephone systems and methods 600. The base station is free of a satellite cellular transmitter. It will be understood that embodiments of FIG. 6 also may be combined with embodiments of FIGS. 1–5. It also will be understood that in other embodiments, non-cellular terrestrial wireless and/or non-cellular satellite communications systems and methods may be used.

As was described above, some embodiments of the present invention stem from a recognition that governmental authorities generally do not regulate whether a particular equipment type can or cannot receive electromagnetic radiation that is being emitted by a source. As such, according to some embodiments of the present invention, satellite band receive antennas may be placed at predetermined terrestrial locations, to intercept and process transmissions of wireless terminals that transmit using a satellite frequency band. A terrestrial network wireless operator may, thus, use the return link frequencies of a satellite system, to enable additional communications on the return links of the terrestrial cellular network. As such, a terrestrial cellular network may provide itself added capacity and/or added quality of service by being able to use some, almost all, or all of its already acquired terrestrial cellular frequencies to serve the system's forward links.

In order to achieve the above, in some embodiments of the present invention, a wireless terminal may be equipped with a receiver and processor that are capable of receiving and processing terrestrial cellular transmissions over terrestrial cellular forward link and/or return link frequencies. The wireless terminal also may be equipped with a receiver that is capable of receiving transmissions from a space-based component over the space-based component's forward link frequencies, and/or may also be equipped to transmit over the space-based component return link frequencies. The satellite band transmissions of the wireless terminal may be intercepted and processed by either the space-based component or by a terrestrial base station, or by both (as may be determined, for example, by an integrated system controller based on received signal strength, signal quality metrics and/or other satellite/terrestrial network prioritization schemes). The wireless terminal also may be configured to transmit over the terrestrial return link frequencies.

Traditionally, driven by the statistically symmetrical nature of voice services, wireless network operators have generally allocated equal amounts of spectrum for their forward and return bands. However, with the advent of high speed packet data services, this strategy may change. Users in packet data mode may desire large data dumps to the wireless terminal in response to relatively few bits being transmitted from the wireless terminal. For example, relatively few bits of information being transmitted in response to, for example, a mouse click from the wireless terminal, a system may send a multi-megabyte file to the wireless terminal.

As such, it may be desirable for a terrestrial wireless operator to identify additional spectrum that can be allocated to the forward link. If some or all of the satellite return link spectrum can be used by such terrestrial operators to serve the statistically lower data capacity needs of the terrestrial return link, some or all of the terrestrial spectrum owned by the wireless operator may be reallocated to serving the higher capacity desires of the terrestrial forward link.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A wireless communications system comprising:
   a space-based component that is configured to transmit communications to wireless terminals over a satellite frequency band and to receive communications from the wireless terminals over a satellite frequency band; and
   a terrestrial component that is configured to transmit communications to the wireless terminals over a terrestrial frequency band and to receive communications from the wireless terminals over a satellite frequency band.

2. A wireless communications system according to claim 1 wherein the terrestrial component is further configured to receive communications from the wireless terminals over a terrestrial frequency band.

3. A wireless communications system according to claim 1 wherein the terrestrial component is further configured to transmit communications to the wireless terminals over forward link and/or return link portions of the terrestrial frequency band.

4. A wireless communications system according to claim 1 wherein the terrestrial component is configured to transmit communications to the wireless terminals over the terrestrial frequency band and to receive communications from the wireless terminals over the satellite frequency band in a first operational mode and is configured to transmit communications to the wireless terminals over the terrestrial frequency band and to receive communications from the wireless terminals over the terrestrial frequency band in a second operational mode.

5. A wireless communications system according to claim 4 wherein the terrestrial component is further configured to receive communications from the wireless terminals over the terrestrial frequency band in the first operational mode.

6. A wireless communications system according to claim 4 wherein the terrestrial component is further configured to transmit communications to the wireless terminals over forward link and/or return link portions of the terrestrial frequency band in the first operational mode.

7. A wireless communications system according to claim 1 in combination with the wireless terminals.

8. A wireless communications system according to claim 1 wherein the satellite frequency band is a cellular satellite frequency band and/or wherein the terrestrial frequency band is a terrestrial cellular frequency band.

9. A wireless terminal comprising:
   a receiver that is configured to receive communications over forward link and/or return link portions of a terrestrial frequency band in a first operation mode; and
   a transmitter that is configured to transmit communications over a satellite frequency band in the first operation mode;
   wherein the receiver is configured to receive communications over a satellite frequency band and the transmitter is configured to transmit communications over a satellite frequency band in a second operational mode.

10. A wireless terminal according to claim 9:
    wherein the transmitter is further configured to transmit communications over a terrestrial frequency band.

11. A wireless terminal according to claim 9 wherein the receiver is configured to receive communications over a terrestrial frequency band and the transmitter is configured to transmit communications over the terrestrial frequency band in a third operational mode.

12. A wireless terminal according to claim 9 wherein the satellite frequency band is a cellular satellite frequency band and/or wherein the terrestrial frequency band is a terrestrial cellular frequency band.

13. A method for expanding capacity of a terrestrial wireless communications system that uses a terrestrial frequency band for communications with wireless terminals, the method comprising:

utilizing a satellite frequency band for terrestrially receiving communications from the wireless terminals without utilizing the satellite frequency band for terrestrially transmitting communications to the wireless terminals.

14. A method according to claim 13 further comprising utilizing forward link and/or return link portions of a terrestrial frequency band for terrestrially transmitting communications to the wireless terminals.

15. A wireless communications system according to claim 13 wherein the satellite frequency band is a cellular satellite frequency band and/or wherein the terrestrial frequency band is a terrestrial cellular frequency band.

* * * * *